(12) United States Patent  
Vail

(10) Patent No.: US 9,095,841 B2  
(45) Date of Patent: Aug. 4, 2015

(54) SEPARATION DEVICE AND CHEMICAL REACTION APPARATUS MADE FROM POLYCRYSTALLINE DIAMOND, APPARATUSES INCLUDING SAME SUCH AS SEPARATION APPARATUSES, AND METHODS OF USE

(75) Inventor: Michael A. Vail, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 731 days.

(21) Appl. No.: 11/809,439

(22) Filed: May 31, 2007

(65) Prior Publication Data

US 2008/0028839 A1  Feb. 7, 2008

Related U.S. Application Data

(60) Provisional application No. 60/835,279, filed on Aug. 2, 2006.

(51) Int. Cl.
    *G01N 30/02* (2006.01)
    *B01J 20/282* (2006.01)
    *B01J 20/281* (2006.01)

(52) U.S. Cl.
    CPC ............. *B01J 20/282* (2013.01); *G01N 30/48* (2013.01); *G01N 30/482* (2013.01)

(58) Field of Classification Search
    CPC .............................. G01N 30/48; G01N 30/482
    USPC ............ 436/161, 183; 422/70, 101, 102, 211, 422/216, 222, 527, 534, 535; 73/23.39, 73/61.53; 210/198.2, 656; 95/88; 96/101
    See application file for complete search history.

(56) References Cited

U.S. PATENT DOCUMENTS 2,819,887 A    2/1954  Eversole et al.
3,345,804 A *  10/1967  Mariani et al. .................... 95/88

(Continued)

FOREIGN PATENT DOCUMENTS

EP     1342502      9/2003
WO     83/02008     6/1983

(Continued)

OTHER PUBLICATIONS http://www.thefreedictionary.com/aggregate, Dec. 8, 2008.*

(Continued)

*Primary Examiner* — Jan Ludlow
(74) *Attorney, Agent, or Firm* — Holland & Hart, LLP

(57) ABSTRACT

The present invention relates to a porous polycrystalline diamond structure that may be employed as a separation device in a separation apparatus for separating at least one reaction product of a chemical reaction, as a stationary phase support and/or stationary phase in chromatography or separation apparatuses, or as a chemical reaction apparatus for conducting a chemical reaction therein. A separation device includes a body of sintered diamond particles. The body includes a proximal inlet end, a distal outlet end, and an intermediate region therebetween. The body further includes a plurality of at least partially interconnected pores that extend between the proximal inlet end and the distal outlet end. The at least partially interconnected pores are capable of communicating fluid from the proximal inlet end to the distal outlet end. Separation apparatuses that utilize the separation device, such as gas or liquid chromatography apparatuses, and chemical reaction apparatuses are also disclosed.

14 Claims, 7 Drawing Sheets

(56) References Cited

U.S. PATENT DOCUMENTS

| | | | |
|---|---|---|---|
| 3,422,032 A | | 1/1969 | Figiel et al. |
| 3,455,841 A | * | 7/1969 | Hirschmann et al. ......... 502/417 |
| 4,224,380 A | | 9/1980 | Bovenkerk et al. |
| 4,534,773 A | | 8/1985 | Phaal et al. |
| 4,572,722 A | | 2/1986 | Dyer |
| 4,789,385 A | | 12/1988 | Dyer et al. |
| 4,805,586 A | | 2/1989 | Borse |
| 5,035,771 A | | 7/1991 | Borse |
| 5,127,923 A | | 7/1992 | Bunting et al. |
| 5,334,283 A | | 8/1994 | Parikh et al. |
| 5,344,526 A | | 9/1994 | Nishibayashi et al. |
| 5,486,263 A | | 1/1996 | Dautremont-Smith et al. |
| 6,106,721 A | | 8/2000 | Bouvier et al. |
| 6,124,012 A | | 9/2000 | Jones, Jr. et al. |
| 6,177,008 B1 | | 1/2001 | Treiber et al. |
| 6,187,203 B1 | | 2/2001 | Tseng |
| 6,190,559 B1 | | 2/2001 | Valaskovic |
| 6,372,002 B1 | | 4/2002 | D'Evelyn et al. |
| 6,498,042 B1 | | 12/2002 | Wilson |
| 6,616,825 B1 | * | 9/2003 | Frechet et al. ................ 204/605 |
| 2004/0118762 A1 | | 6/2004 | Xu et al. |
| 2004/0121070 A1 | | 6/2004 | Xu et al. |
| 2005/0211616 A1 | | 9/2005 | DiLeo et al. |
| 2005/0211617 A1 | | 9/2005 | Held et al. |
| 2005/0252859 A1 | | 11/2005 | Hofmann et al. |
| 2006/0036106 A1 | | 2/2006 | Mazanec et al. |
| 2006/0042171 A1 | * | 3/2006 | Radtke et al. .................... 51/307 |
| 2006/0154304 A1 | | 7/2006 | Han et al. |
| 2008/0028839 A1 | | 2/2008 | Vail |
| 2008/0223786 A1 | | 9/2008 | Xu et al. |
| 2008/0314812 A1 | * | 12/2008 | Kareh et al. ............... 210/198.2 |
| 2009/0218287 A1 | | 9/2009 | Vail et al. |
| 2010/0108608 A1 | | 5/2010 | Cowieson |

FOREIGN PATENT DOCUMENTS

| | | |
|---|---|---|
| WO | 94/06152 | 3/1994 |
| WO | 97/11923 | 4/1997 |
| WO | 01/46493 | 6/2001 |

OTHER PUBLICATIONS http://www.thefreedictionary.com/polycrystalline, Dec. 8, 2008.*

Mikhalovsky et al, "Structural and Adsorption Characteristics of Porous Industrial Diamond" in Innovative Superhard Materials and Sustainable Coatings for Advanced Manufacturing, Lee and Novikov, eds., pp. 169-182 (2005).*

Yushin et al, Diamond and Related Materials 14 (2005) 1721-1729.*

S.J. Pearton; A. Katz; F. Ren; J.R. Lothian, Summary of "ECR plasma etching of chemically vapour deposited diamond thinfilms," Electronic Letters, Apr. 23, 1982, vol. 28, Issue 9, pp. 822-824.

Johannes Enlund; Jan Isberg; Mikael Karlsson; Fredrik Nikolajeff; Jorgen Olsson & Daniel J. Twitchen, "Anisotropic dry etching of boron doped single crystal CVD diamond," Carbon, Aug. 2005, vol. 43, Issue 9, pp. 1839-1842.

J.E. Field, "The Properties of Natural and Synthetic Diamond," Elsevier Academic Press, 1992, pp. 204, 427, 430-431, 454, and 489.

Yuichi Yamazaki; Kenji Ishikawa; Norikazu Mizuochi and Satoshi Yamasaki, Abstract of "Etching Damage in Diamond Studied Using an Energy-Controlled Oxygen Ion Beam," Japanese Journal of Applied Physics, 2007, vol. 46, No. 1, pp. 60-64.

"Properties of natural diamond microlenses fabricated by plasma etching," Industrial Diamond Review, Feb. 2005, pp. 29-32.

M.H. Nazare and A.J. Neves, "Properties, Growth and Applications of Diamond," Mar. 2000, pp. 115-118.

Pavel N. Nesterenko; Olga N. Fedyanina; Yurii V. Volgin; Phil Jones, "Ion chromatographic investigation of the ion-exchange properties of microdisperse sintered nanodiamonds," Journal of Chromatography A, 2007, vol. 1155, pp. 2-7.

Pavel N. Nesterenko; Olga N. Fedyanina and Yu.V. Volgin, "Microdispersed sintered nanodiamonds as a new stationary phase for high-performance liquid chromatography," Analyst, 2007, vol. 132, pp. 403-405.

G.P. Bogatyreva, M.A. Marinich, and G.A. Bazaliy, "Some New Applications for Synthetic Diamond Powders".

Yansheng Liu. "Investigation of Novel Microseparation Techniques", (Ph.D. dissertation, Brigham Young University, Aug. 2007) 1-165.

Xianglei Kong, L.C. Lora Huang, S.C. Vivian Liau, Chau-Chung Han, and Huan-Cheng Chang, "Polylysine-Coated Diamond Nanocrystals for MALDI-TOF Mass Analysis of DNA Oligonucleotides," Analytical Chemistry, vol. 77, No. 13, Jul. 1, 2005, pp. 4273-4277.

Sahadevan Sabu, Fu-Chia Yang, Yi-Sheng Wang, Wei-Hao Chen, Meng-Ing Choum, Huan-Cheng Chang, and Chau-Chung Han, "Peptide analysis: Solid phase extraction-elution on diamond combined with atmospheric pressure matrix-assisted laser desorption/ionization-Fourier transform ion cyclotron resonance mass spectrometry," Analytical Biochemistry 367 (2007) pp. 190-200.

Wei-Hao Chen, Sheng-Chung Lee, Sahadevan Sabu, Huei-Chun Fang, Shu-Chien Chung, Chau-Chung Han, and Huan-Cheng Chang, "Solid-Phase Extraction and Elution on Diamond (SPEED): A Fast and General Platform for Proteome Analysis with Mass Spectrometry," Analytical Chemistry, vol. 78, No. 12, Jun. 15, 2006, pp. 4228-4234.

Yushin, G.N., et al., "Effect of sintering on structure of nanodiamond", Diamond & Related Materials, 2005, vol. 14, pp. 1721-1729.

Transmittal of PCT International Search Report for PCT International Application No. PCT/US07/12879; Jul. 7, 2008.

PCT International Search Report for PCT International Application No. PCT/US07/12879; Jul. 7, 2008.

PCT Written Opinion of the International Searching Authority for PCT International Application No. PCT/US07/12879; Jul. 7, 2008.

Patel et al. (1968) Abstract Only—Etching of Trigons on the (111) Faces of Diamond; J. Phys. D: Appl. Phys. 1:1445-1447.

Patel et al. (1969) Abstract Only—A New Method of Etching Diamond; J. Appl. Cryst. 2:183-188.

Sun et al. (2000) Preferential Oxidation of Diamond (111); J. Phys. D: Appl. Phys. 33:2196-2199.

Uchida et al. (2007) Disaggregation and Surface Modification of Nano-Size Diamond by Ultrasound Exposure: Relationships among Acoustic Intensity, Disaggregation, and Surface Modification; Electronics and Communications in Japan, Part 3 90(12):10-18.

Bjorkman H. et all., "Diamond microchips for fast chromatography of proteins" Sensors and Actuators B, Elsevier Sequoia S.A., Lausanne, CH, vol. 79, No. 1, Sep. 25, 2001, p. 71-77.

Bondar, V.S., Pozdnyakova I.O. and A.P. Puzyr, "Applications of Nanodiamonds for Separation and Purification of Proteins" Physics of the Solid State, vol. 46, No. 4, Apr. 2004, pp. 758-760.

Hirschmann R P et al, "Synthetic diamond—A solid absorbent for corrosive gases" Journal of Chromatography, STN, Taipei, Taiwan, vol. 34, Jan. 1, 1968, pp. 78-80.

Supplementary European Search Report dated Dec. 21, 2009, for EP Application No. 07 80 9264 (8 pages).

A.R. Patel et al. (1968) Abstract of "Etching of trigons on the (111) faces of diamonds"; J. Phys. D: Appl. Phys. 1:1445-1447.

A.R. Patel et al. (1969) Abstract of "A new method of etching diamond"; J. Appl. Cryst. 2:183-188.

Chang Q Sun, H Xie, W Zhang, H Ye, P Hing (2000), "Preferential oxidation of diamond (111)"; J. Phys. D: Appl. Phys. 33:2196-2199.

Takeyoshi Uchida, Akiki Hamano, Norimichi Kawashima and Shinichi Takeuchi (2007) "Disaggregation and Surface Modification of Nano-Size Diamond by Ultrasound Exposure: Relationships amoung Acoustic Intensity, Disaggregation, and Surface Modification"; Electronics and Communications in Japan, Part 3, 90 (12): 10-18.

International Search Report and Written Opinion for PCT Application No. PCT/US2007/012879; Jul. 7, 2008.

Webpage, "Chromatography—Equipment" (visited Jul. 11, 2006), 2 pages.

(56) References Cited

OTHER PUBLICATIONS

Webpage, "Chromatography—The Chromatogram" (visited Jul. 11, 2006), 1 page.
Webpage, "Gas Chromatography" (visited Jul. 11, 2006), 1 page.
Webpage, "Liquid Chromatography" (visited Jul. 11, 2006), 1 page.
Webpage, "Chromatography—Basic Operation" (visited Jul. 11, 2006), 2 pages.
Office Action dated Jun. 30, 2010 related U.S. Appl. No. 12/074,398, Michael A. Vail.
Final Office Action dated Nov. 1, 2010 related U.S. Appl. No. 12/074,398, Michael A. Vail.
Stromberg, et al., "Sintering of Diamond at 1800°-1900° C. and 60-65 kbar," Ceramic Bulletin, vol. 49, No. 12 (1970), pp. 1030-1032.
Hall, H. Tracy, "Sintered Diamonds," Science, vol. 169 (1970), pp. 1-2.
Final Office Action dated Nov. 1, 2010 related to U.S. Appl. No. 12/074,398, Michael A. Vail.
Final Office Action issued on related U.S. Appl. No. 12/074,398, on Apr. 8, 2015.
Non-Final Office Action issued on related U.S. Appl. No. 12/074,398, on Sep. 29, 2014.

* cited by examiner

US 9,095,841 B2

SEPARATION DEVICE AND CHEMICAL REACTION APPARATUS MADE FROM POLYCRYSTALLINE DIAMOND, APPARATUSES INCLUDING SAME SUCH AS SEPARATION APPARATUSES, AND METHODS OF USE

CROSS-REFERENCE TO RELATED APPLICATION

This application claims the benefit of Provisional Application No. 60/835,279, filed on Aug. 2, 2006, the disclosure of which is incorporated herein by reference.

TECHNICAL FIELD

The present invention relates to chromatography, separation, and chemical reaction apparatuses. More particularly, the present invention relates to a porous polycrystalline diamond structure that may be employed as a separation device in a separation apparatus for separating at least one reaction product of a chemical reaction, as a stationary phase support and/or stationary phase in chromatography or separation apparatuses, or as a chemical reaction apparatus for conducting a chemical reaction therein.

BACKGROUND

Chromatography is a well known method of separating a sample composed of one or more chemical constituents to aid in the determination of the identity of the chemical constituents and quantitatively determine the concentration of the chemical constituents. FIG. 1 shows a typical chromatography apparatus 10 in accordance with the prior art. The chromatography apparatus 10 includes a mobile phase supply 12 holding a mobile phase or carrier fluid 13 that is typically, a solvent in liquid chromatography and an inert gas in gas chromatography. The mobile phase supply 12 is coupled to a pump 14 via a fluid line 16. The pump 14 is operable to pump the mobile phase 13 from the mobile phase supply 12 to a mixture injection port 20 via fluid line 18. A sample supply 21, holding a sample 22 to be analyzed, is also coupled to the mixture injection port 20 through a fluid line 24. In operation, the pump 14 pumps the mobile phase 13, which sweeps the sample 22 through the mixture injection port 20 and a feed line 26, and into a packed column 28 having a stationary phase support 38 (FIG. 2).

The packed column 28 may be surrounded by a heating element 34 that is operable to heat the packed column 28 to a desired temperature. A detector 32 is coupled to the packed column 28 via a fluid line 30 to receive the different chemical constituents of the sample 22 separated by the packed column 28 and is configured to indicate the presence and/or concentration of chemical constituents of the sample 22 being analyzed by measuring a property that is related to the concentration and/or characteristic of the chemical constituents.

As shown in FIG. 2, the packed column 28 includes a tubular housing 36 formed from a glass, metal, or polymer that encloses and supports the stationary phase support 38. Some of the more common materials that the stationary phase support 38 can be made from is diamond powder, silica powder, and graphitic powder that define a generally granular porous structure through which the mixture of the mobile phase 13 and the sample 22 can pass through. The powdered materials may serve as a stationary phase if the chemical constituents of the sample 22 have different affinities to the powdered materials. However, sometimes the powdered materials may be coated with a liquid, an adsorbent, or chemical species that functions as the stationary phase and the powdered material merely serves as a support structure. The housing 36 has a liner 40 coating the interior thereof to help reduce chemical activity between the sample 22 and the housing 36. The liner 40 can be formed from an inert material such as polytetrafluoroethylene ("PTFE") or a metallic material such as stainless steel or nickel.

With reference to FIGS. 1 and 2, in operation, a mixture 27 of the mobile phase 13 and the sample 22 are introduced into the packed column 28 through the mixture injection port 20. As the mixture 27 passes through the stationary phase support 38 of the packed column 28, a flow 42 of different chemical constituents 42a and 42b emerge from the packed column 28 at different times. As best shown in FIG. 2, the constituent 42a with the least affinity for the stationary phase support 38 or a stationary phase disposed therein emerges first, while the constituent 42b with the greatest affinity for the stationary phase support 38 or a stationary phase disposed therein emerges at a later time. The flow 42 of the constituents 42a and 42b are collected as they emerge from the packed column 28 and the detector 32 analyzes the flow 42 by measuring a property that is related to the concentration and characteristic of the chemical constituents 42a and 42b such as the refractive index or ultra-violet absorbance in order to identify the chemical composition and concentration of the constituents 42a and 42b. The signal from the detector 32 can be displayed on a computer (not shown) or another display device.

One problem with the prior art chromatography apparatus 10 is that a highly basic or acidic mobile phase 13 and/or sample 22 can chemically attack and degrade the liner 40 and/or the stationary phase support 38. This degradation can be further exacerbated at high temperatures. For example, a PTFE liner 40 is limited to temperatures below 200° C. Degradation of the liner 40 and the stationary phase support 38 can introduce error into any subsequent chemical analysis performed by the detector 32 on the constituents 42a and 42b.

Therefore, there is a still a need for a separation device, and a stationary phase and/or support structure that can be used at high temperatures and/or with a wide range of highly aggressive chemicals.

SUMMARY

The present invention relates to a porous polycrystalline diamond structure that may be employed as a separation device in a separation apparatus for separating at least one reaction product of a chemical reaction, as a stationary phase support and/or stationary phase in chromatography or separation apparatuses, or as a chemical reaction apparatus for conducting a chemical reaction therein. One aspect of the present invention is directed to a separation device comprised of polycrystalline diamond for use in a separation apparatus. The separation device comprises a body of sintered diamond particles. The body includes a proximal inlet end, a distal outlet end, and an intermediate region therebetween. The body further includes a plurality of at least partially interconnected pores that extend between the proximal inlet end and the distal outlet end. The at least partially interconnected pores are capable of communicating fluid from the proximal inlet end to the distal outlet end. In one embodiment, the chemical structure of the diamond internal surfaces of the at least partially interconnected pores function as a stationary phase and, thus, the body of the separation device itself serves as the stationary phase. In another embodiment, a stationary phase may be disposed within the at least partially interconnected pores of the separation device and, thus, the separation device serves as a stationary phase support.

A further aspect of the present invention is directed to a separation apparatus that may be used in gas/liquid chromatography or for separating at least one reaction product from a chemical reaction. The separation apparatus includes a fluid supply system operable to provide a fluid. A separation device is coupled to the fluid supply system to receive the fluid therefrom. The separation device comprises a body of sintered diamond particles. The body includes a proximal inlet end, a distal outlet end, and an intermediate region therebetween. The body further includes a plurality of at least partially interconnected pores that extend between the proximal inlet end and the distal outlet end. The at least partially interconnected pores are capable of communicating fluid from the proximal inlet end to the distal outlet end. In operation, the fluid provided by the fluid supply system flows through the passageways of the body of the separation device. In one embodiment, chemical constituents of the fluid may be separated as they pass through the passageways and emerge from separation device at different rates where they can be analyzed, such as in chromatography, or further processed. In another embodiment, different reagents may be flowed through the separation device to react within the separation device. In such an embodiment, the at least partially interconnected pores of the separation device may be structured to allow at least one reaction product to exit through the distal outlet end, while waste product exits through another portion in the separation device.

Yet a further aspect of the present invention is directed to a chemical reaction apparatus comprised of polycrystalline diamond that may be employed for conducting a chemical reaction therein. The chemical reaction apparatus comprises a body of sintered diamond particles. The body includes a proximal inlet end, a distal outlet end, and an intermediate region therebetween. The body further includes a plurality of at least partially interconnected pores that extend between the proximal inlet end and the distal outlet end. The at least partially interconnected pores are capable of communicating fluid from the proximal inlet end to the distal outlet end. During use, at least one chemical constituent may be flowed into the at least partially interconnected pores of the body and a chemical reaction occurs therein, such as cracking of the at least one chemical constituent or reaction with other chemical constituents that are also flowed into the at least partially interconnected pores of the body.

DETAILED DESCRIPTION OF VARIOUS EMBODIMENTS

Figure 1:
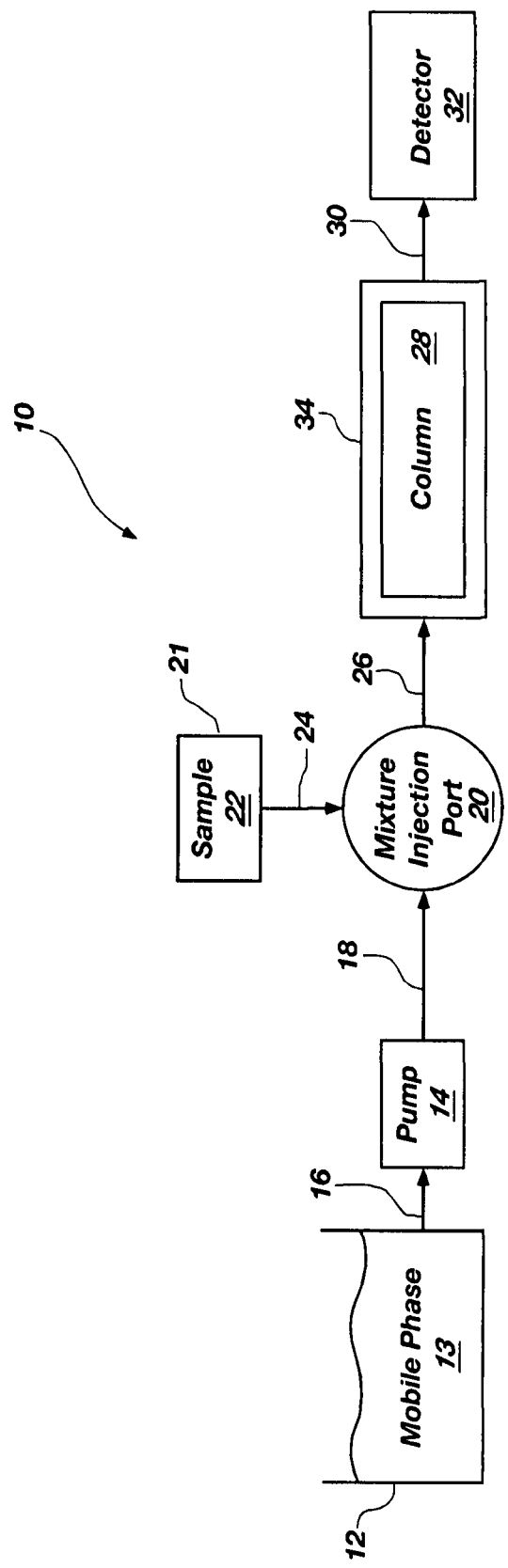
FIG. 1 is a functional block diagram of a chromatography apparatus in accordance with the prior art.
Figure 2:
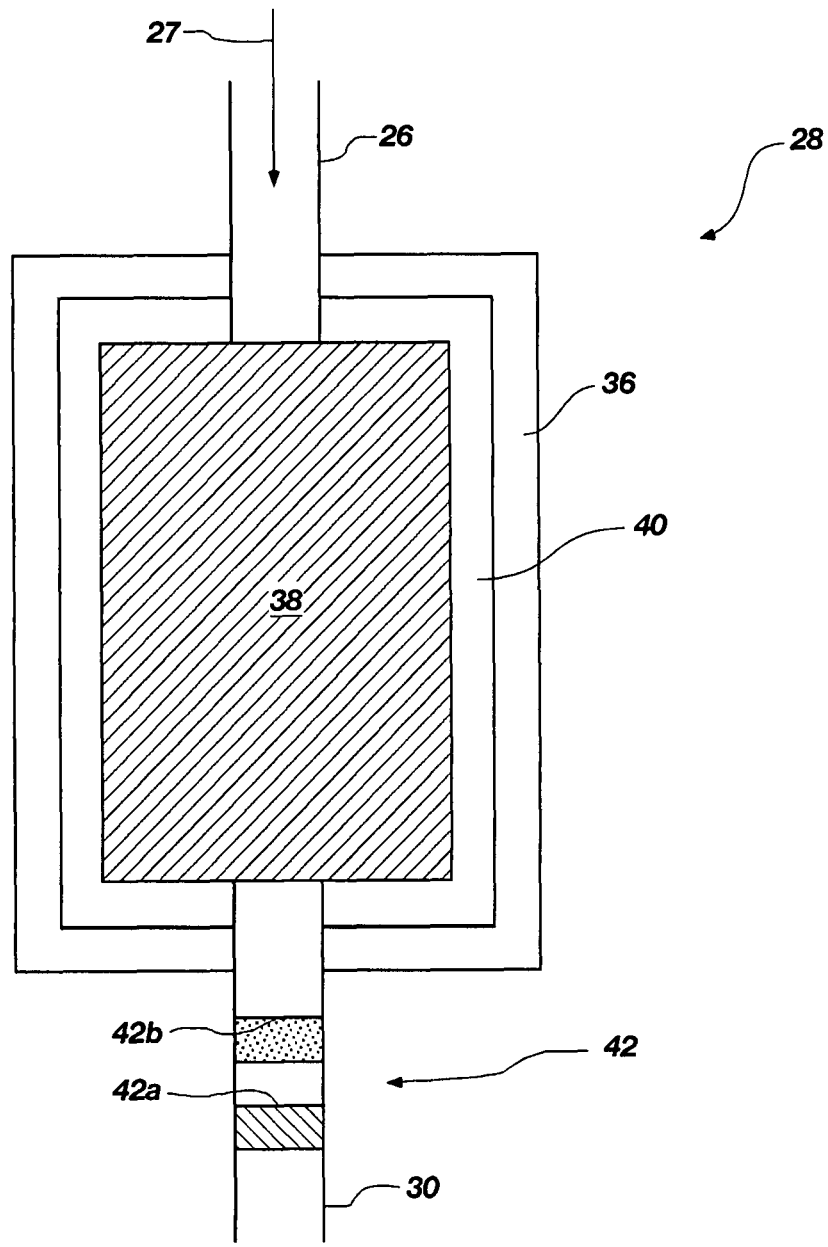
FIG. 2 is a schematic cross-sectional view of the packed column of FIG. 1.

The present invention relates to a porous polycrystalline diamond structure that may be employed as a separation device in a separation apparatus for separating at least one reaction product of a chemical reaction, as a stationary phase support and/or stationary phase in chromatography or separation apparatuses, or as a chemical reaction apparatus for conducting a chemical reaction therein. Many specific details of certain embodiments of the present invention are set forth in the following description and in FIGS. 3 through 8 in order to provide a thorough understanding of such embodiments. One skilled in the art, however, will understand that the present invention may have additional embodiments, or that the present invention may be practiced without several of the details described in the following description. In the figures and description below, like or similar reference numerals are used to represent like or similar elements.

Figure 3:
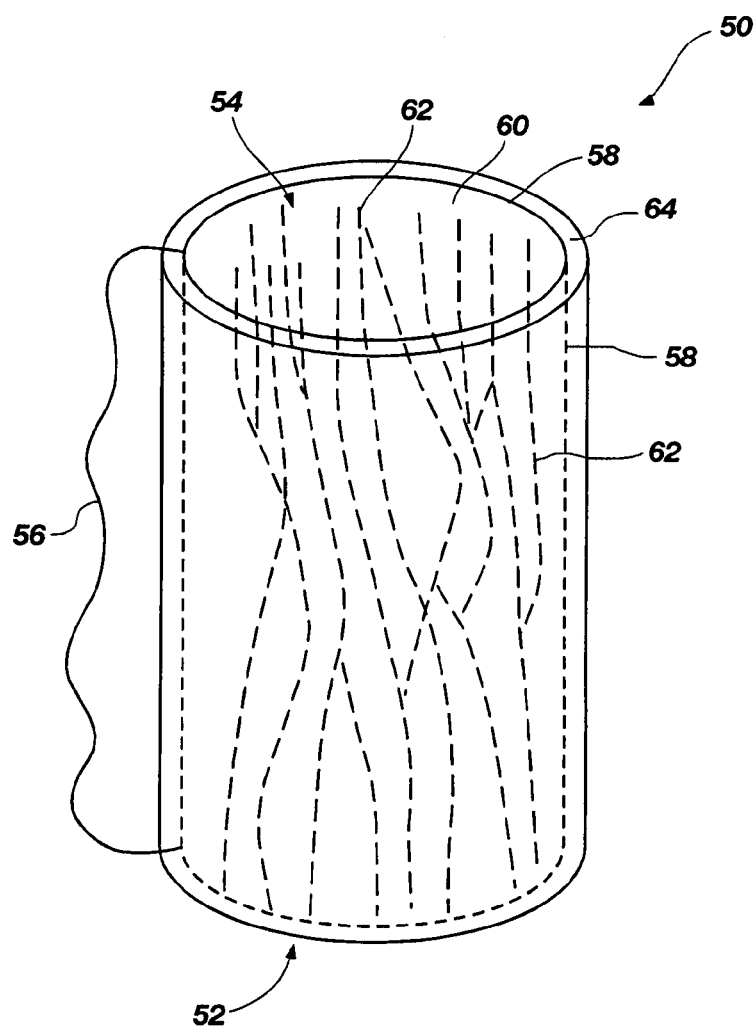
FIG. 3 is a schematic isometric view of a stationary phase support in accordance with one embodiment of the present invention.
Figure 4:
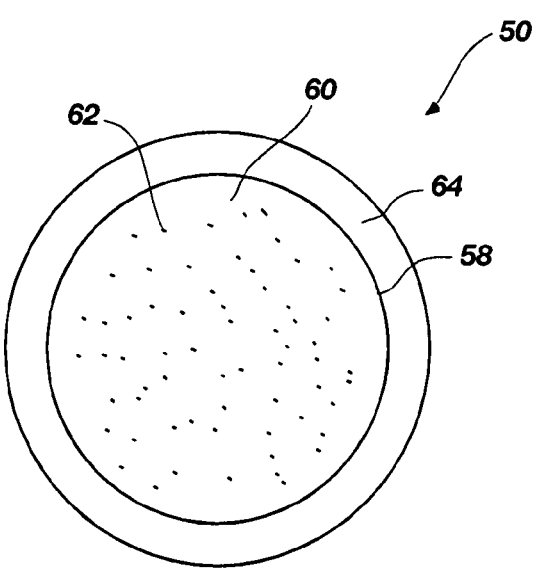
FIG. 4 is a transverse schematic cross-sectional view of the stationary phase support of FIG. 3.
Figure 5:
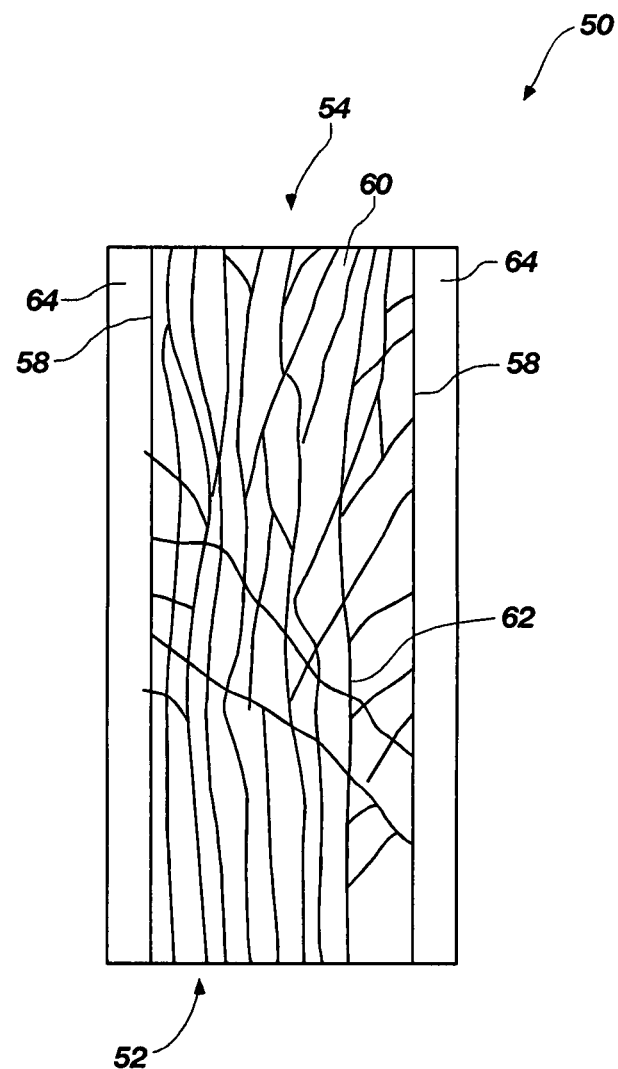
FIG. 5 is a longitudinal schematic cross-sectional view of the stationary phase support of FIG. 3.

Various embodiments of the present invention are directed to separation devices that may be used as stationary phase supports, stationary phases, and filters. FIGS. 3 through 5 show a stationary phase support 50 in accordance with one embodiment of the present invention. The stationary phase support 50 may be used in gas/liquid chromatography apparatuses and other chemical processing apparatuses. The stationary phase support 50 includes a body 60 having a proximal inlet end 52, a distal outlet end 54, and an intermediate region 56 therebetween with a peripheral surface 58. The body 60 is formed of a mass of sintered diamond particles having a plurality of at least partially interconnected pores therein. As known in the art, diamond particles typically comprises a single crystal or grain of diamond. However, diamond particles may also be polycrystalline. Although the body 60 is shown in FIGS. 3 through 5 having a generally cylindrical shape, a variety of other geometries may be used, without limitation.

The at least partially interconnecting network of pores form a plurality of passageways 62 (shown in phantom in FIG. 3) that extend from the inlet end 52 to the outlet end 54. Accordingly, the passageways 62 are structured to enable fluids, such as gases or liquids, to flow into the body 60 through the inlet end 52, pass through the intermediate region 56, and exit through the outlet end 54 (or vice-versa). In the illustrated embodiment, optionally, a substantially non-porous diamond coating 64 is formed on the peripheral surface 58 of the body 60 to seal the peripheral surface 58 so that fluid cannot enter or exit through the peripheral surface 58. The substantially non-porous diamond coating 64 may at least partially fill any pores distributed on the peripheral surface 58. As such, fluid flow is inhibited from communicating through the peripheral surface 58,. Rather, fluid flow communicates between the inlet end 52 and the outlet end 54. Furthermore, a liner is not needed between the stationary phase support 50 and housing 36 (FIG. 7) that encloses and supports the stationary phase support 50 because the substantially non-porous diamond coating 64 provides a generally inert chemical barrier between the housing 36 and the body 60. However, in another embodiment, the substantially non-porous diamond coating 64 may be omitted.

In one embodiment, the stationary phase support 50 is used as the stationary phase in a separation or chromatography apparatus. In such an embodiment, the diamond particles that comprise the body 60 have suitable chemical characteristics for separating particular chemical constituents of a sample being analyzed. Thus, in this embodiment, the stationary phase support 50 also functions as the stationary phase in a separation or chromatography apparatus.

In another embodiment, at least a portion of selected interior diamond surfaces of the pores of the body 60 that define the passageways 62 may be chemically modified, such as with hydroxyl groups, so that different chemical constituents in a sample to be analyzed will have varying degrees of affinity to the body 60 of sintered diamond particles. U.S. Patent Application Publication US2004/0118762 to Xu et al.; the disclosure of which is incorporated herein in its entirety by this reference, discloses methods for chemically modifying diamond surfaces that are chemically stable in highly basic solutions. In yet another embodiment, a stationary phase such as, for example, a liquid, an adsorbent, or another substance may at least partially coat or cover selected interior diamond surfaces of the body 60 that define the passageways 62. Examples of suitable stationary phases that may be disposed within the passageways 62 are polymeric stationary phases, porous graphitized carbon, $C_6$ hydrocarbons, $C_8$ hydrocarbons, $C_{12}$ hydrocarbon, $C_{18}$ hydrocarbons, cyclohexyl, phenyl, or another suitable stationary phase.

The body 60 may be formed from sintered diamond particles having a variety of different particles sizes. For example, prior to sintering, the diamond particles may have an average particle size from about 1 nm to about 1000 μm, and more typically from about 2 μm to about 150 μm. In one embodiment, the body 60 is formed by sintering diamond particles having a selected average particle size or a selected multi-mode distribution of diamond particle sizes using an ultra-high pressure, ultra-high temperature ("HPHT") process. The sintering may be effected in an ultra-high pressure press at process conditions of, for example, a pressure of at least about 40 kilobar (e.g., about 50 kilobar to about 70 kilobar) and a temperature of at least about 1000° C. (e.g., about 1100° C. to about 1600° C.) for a time sufficient to consolidate and form a coherent mass of bonded diamond grains.

After sintering, the peripheral surface 58 of the body 60 may be coated with the substantially non-porous diamond coating 64. In one embodiment, the substantially non-porous diamond coating 64 may be diamond deposited by chemical vapor deposition ("CVD"), physical vapor deposition ("PVD"), or another suitable deposition process that is capable of depositing a substantially non-porous diamond layer. In another embodiment, multiple bodies 60 may be positioned adjacent to one another so that a distal end 54 of one body 60 abuts or adjoins to a proximal end 52 of another body 60 to construct a larger stationary phase support 50. After positioning or assembly of the multiple bodies 60, the multiple bodies 60 may be coated with the substantially non-porous diamond coating 64, as described above, to cover and seal the peripheral surfaces 58 thereof and join the multiple bodies 60 together. The number of the stationary phase supports 50 positioned end-to-end is limited only by the size of the deposition chamber for depositing the substantially non-porous diamond coating 64.

In some applications, the pore size of the body 60 may be varied along the length of the body 60. The pore size may be varied by layering different sized diamond grains. For example, a first half of the intermediate region 56 of the body 60 may be formed from diamond particles having a first average particle size and the second half of the intermediate region 56 may be formed from diamond particles having a second average particle size different than the first diamond particle size. In other embodiments, more than two regions of the body 60 of the stationary phase support 50 may exhibit different pores sizes. Accordingly, a pore size of a selected region of the body 60 may be tailored by selection of the precursor diamond particle size and the sintering pressure. In another embodiment, the pore size may vary radially in the body 60 or a variety of other pore configurations may be used, without limitation.

Figure 6:
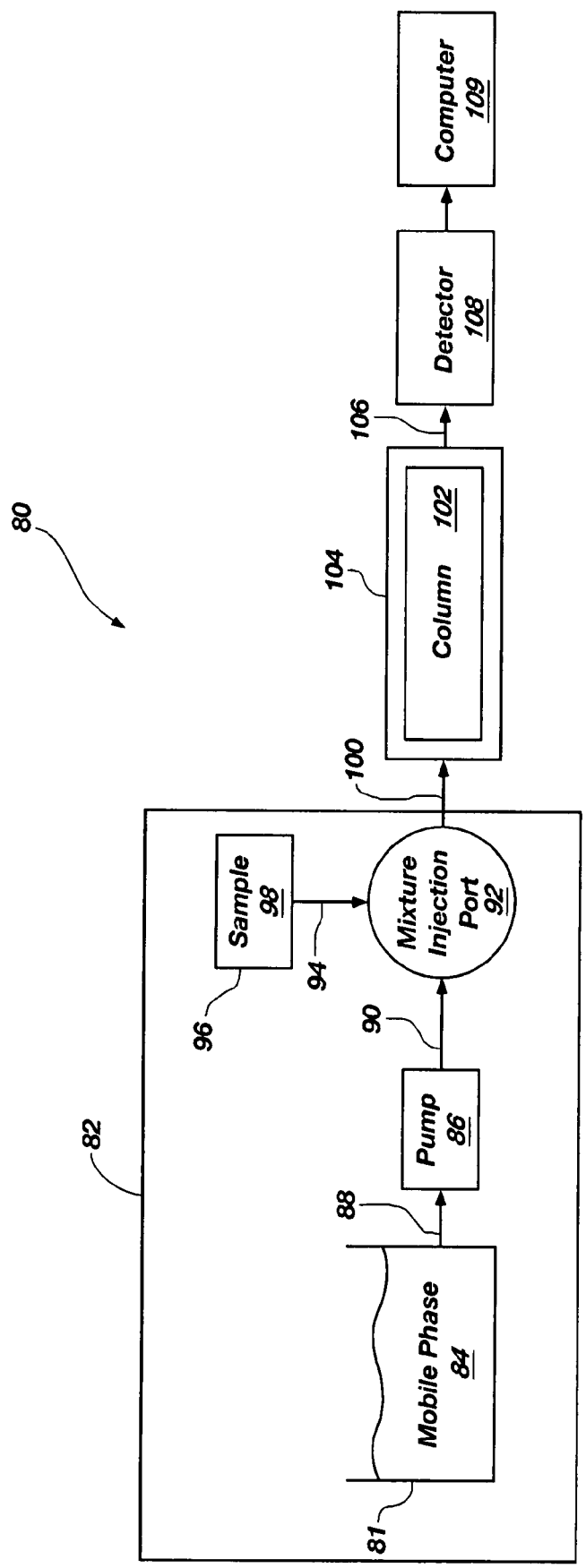
FIG. 6 is a functional block diagram of a chromatography apparatus in accordance with one embodiment of the present invention.

FIG. 6 shows a chromatography apparatus 80 that utilizes the stationary phase support 50 in accordance with the one embodiment of the present invention. The chromatography apparatus 80 is suitable for use in gas and liquid chromatography. The chromatography apparatus 80 includes a fluid supply system 82. The fluid supply system 82 includes a mobile phase supply 81 holding a mobile phase 84 that is typically, a solvent in liquid chromatography and an inert gas (e.g., He, $N_2$, or $H_2$) in gas chromatography. The mobile phase supply 81 is coupled to a pump 86 via a fluid line 88. The pump 86 is operable to pump the mobile phase 84 from the mobile phase supply 81 to a mixture injection port 92 via a fluid line 90. The fluid supply system 82 further includes a sample supply 96, holding a sample 98 to be analyzed, that is also coupled to the mixture injection port 92 through a fluid line 94. In operation, the pump 86 pumps the mobile phase 84, which sweeps the sample 98 through the mixture injection port 92 and a fluid line 100, and into a column 102 having a stationary phase support 50 (FIGS. 3-5). As known in the art, in gas chromatography, the sample 98 is a gas or a volatile liquid swept into the column 102 by a gaseous mobile phase 84, and in liquid chromatography, the sample 98 is a liquid phase that is dissolved by a solvent mobile phase 84. Instead of using the pump 86 to move the mobile phase 84, capillary action or gravity may be used to effect movement of the mobile phase 84 and the sample 98 through the mixture injection port 92 and into the column 102, or another suitable introduction technique.

A heating element 104 such as, for example, resistance heating elements may be positioned proximate to or in the column 102 for heating the stationary phase support 50 (FIGS. 3-5) to a desired temperature. In gas chromatography, the heating element 104 may be used for vaporizing a volatile liquid sample 98 upon the sample 98 entering the stationary phase support 50.

The chromatography apparatus 80 further includes a detector 108 that is coupled to the column 102 via a fluid line 106 to receive the different chemical constituents of the sample 98 separated by the stationary phase support 50 (FIGS. 3-5) of the column 102. The detector 108 is configured to indicate the identity and concentration of chemical constituents of the sample 98 being analyzed by measuring a property that may be related to the concentration and/or characteristic of the chemical constituents. In various embodiments, the detector 102 may be a thermal conductivity detector, a flame ionization detector, an electron capture detector, a flame photometric detector, an atomic emission detector, a mass spectrometer, a Fourier transform infrared spectrophotometer, an ultraviolet absorbance detector, an electrochemical detector, or another suitable analytical instrument capable of determining the identity and/or concentration of chemical constituents separated by the column 102. The signal output from the detector 108 is transmitted to a computer 109 or other display device for storing and displaying the collected data in a useful manner such as a graphical display.

Figure 7:
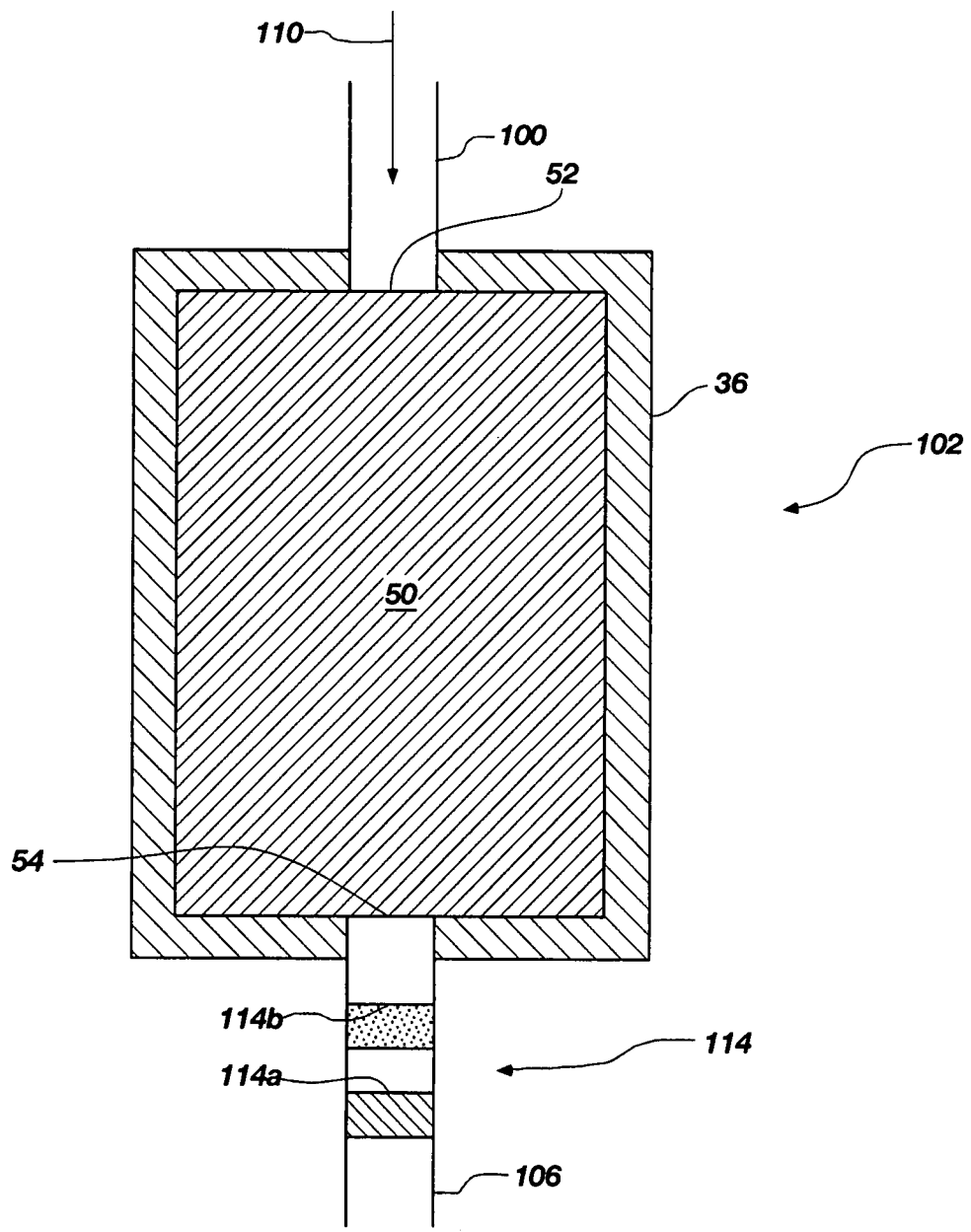
FIG. 7 is a schematic cross-sectional view of a column utilizing the stationary phase support of FIGS. 3 through 5 in accordance with one embodiment of the present invention.

With reference to FIGS. 6 and 7, in operation, the mobile phase 84 and the sample 98 are introduced into the column 102 through the mixture injection port 92. Mixture 110 of the mobile phase 84 and the sample 98 enter the stationary phase support 50 through the inlet end 52 thereof. As the mixture 110 of the mobile phase 84 and the sample 98 passes through the intermediate region 56 of the stationary phase support 50, the chemical constituents of the mixture 110, and in particular the sample 98, are slowed by their respective affinity for the stationary phase support 50 or a stationary phase disposed within the passageways 62 (FIGS. 3-5) of the stationary phase support 50. A flow 114 of different chemical constituents 114a and 114b of the mixture 110 emerge from the outlet end 54 of the stationary phase support 50 of the column 102 at different times. For example, a chemical constituent 114a with the least affinity for the stationary phase support 50 or a stationary phase disposed within the passageways 62 (FIGS. 3-5) of the stationary phase support 50 flows through the stationary phase support 50 at a relatively fast rate and emerges first from the outlet end 54, while the chemical constituent 114b with the greatest affinity for the stationary phase support 50 or a stationary phase disposed within the passageways 62 (FIGS. 3-5) of the stationary phase support 50 flows at a relatively slower rate and emerges at a later time from the outlet end 54.

The flow 114 of the chemical constituents 114a and 114b are collected as they emerge from the outlet end 54 of the stationary phase support 50, and the detector 108 analyzes the flow by measuring a property that is related to the concentration and/or characteristic of the chemical constituents 114a and 114b using any of the aforementioned detection techniques.

It should be emphasized that the chromatography apparatus 80 is merely one embodiment of a separation apparatus that may be used with the various embodiments of stationary phase supports and stationary phases disclosed herein. Many modifications and adaptations to the chromatography apparatus 80 will be apparent to one of ordinary skill in the art such as modifications to the various components of the fluid supply system 82 and the various components of the column 102 such as the heater 104 and the configuration of the housing 36.

The embodiments for the stationary phase supports 50 disclosed herein are suitable for separating chemical constituents of the mixture 110 that are highly aggressive such as when analyzing chemicals generated in the production of oil and natural gas, pharmaceuticals, or bio-chemicals. The stationary phase support 50 is made from highly chemical resistant diamond and, thus, is capable of withstanding exposure to chemically aggressive solutions that have a pH less than about 5 or a pH greater than about 8 without significant chemical degradation. For example, highly acidic hydrofluoric acid may be used as the mobile phase 84. As another example, sodium hydroxide may also be used either as a highly concentrated basic solution or in a pure liquid form as the mobile phase 84. Furthermore, the stationary phase support 50 made from diamond is capable of withstanding temperatures in excess of 1000° C., which may be necessary for particular chemical analysis, separation processes, or reaction processes.

In addition to the use of the stationary phase support 50 in chromatography apparatuses, the stationary phase support 50 may be used for carrying out chemical reactions in highly aggressive chemical environments. For example, the stationary phase support 50 may be used for purifying specific chemicals such as, for example, at least one protein using highly aggressive solvents that may not be compatible with conventional stationary phases or stationary phase supports.

In such an embodiment, the chemical being purified is the sample 98 and the solvent is the mobile phase 84. The mobile phase 84 (i.e., the solvent) with the sample 98 (i.e., at least one protein) dissolved therein passes through the stationary phase support 50 and the purified at least one protein, the solvent, and the impurities of the protein flow through the outlet end 54 of the stationary phase support 50 at different rates where they captured, and further processed, chemically analyzed using the detector 108 as previously described, or both.

In other embodiments, the body 60 comprised of porous polycrystalline diamond may be employed as a chemical reaction apparatus that does not necessarily effect separation of any chemical constituents. In such an embodiment, at least one chemical constituent may be flowed into the body 60 that is maintained at a high temperature that effects cracking of the at least one chemical constituent. In a further embodiment, highly aggressive chemical constituents may be flowed into the body 60 and a chemical reaction therebetween may take place within the passageways 62 of the body 60. Due to the body 60 being made from polycrystalline diamond that is very resistant to high temperature degradation and aggressive chemicals, the chemical reaction may involve highly aggressive chemical constituents and may take place at very high temperatures. Additionally, the high surface provided by the internal diamond surfaces of the passageways 62 may facilitate reaction between chemical constituents flowed into the passageways 62. In other embodiments, a suitable catalyst may be provided on the internal diamond surfaces of the passageways 62 to speed the reaction between chemical constituents flowed into the passageways 62.

Figure 8:
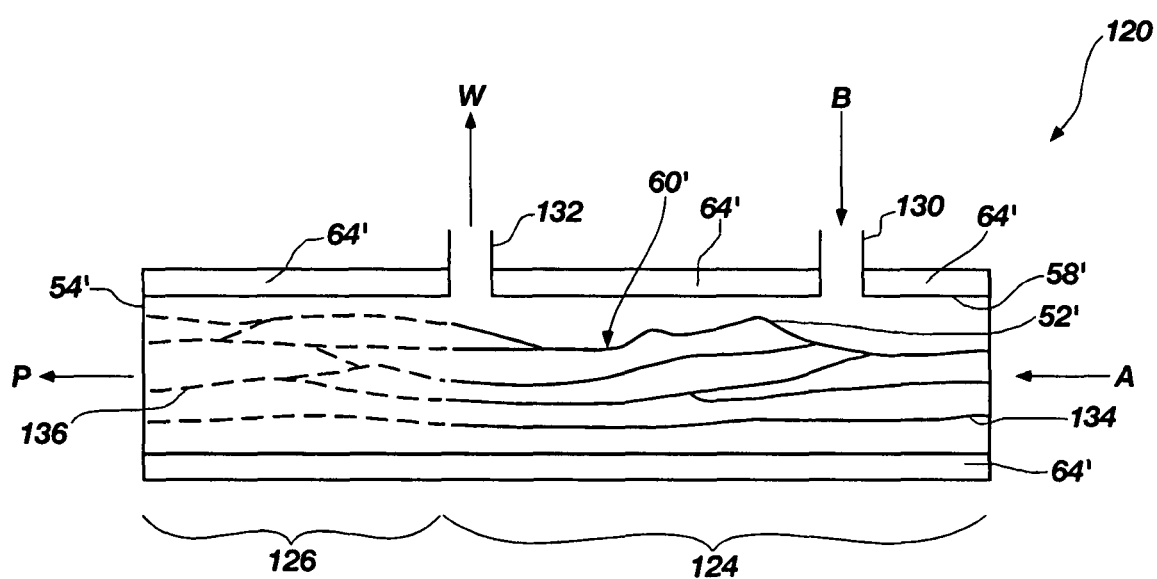
FIG. 8 is a schematic cross-sectional view of a separation device that may be used for selectively separating at least one reaction product of a chemical reaction that is carried out within the separation device in accordance with another embodiment of the present invention.

Another embodiment of the present invention is directed to a separation device that may be used for selectively separating at least one reaction product of a chemical reaction. FIG. 8 shows a separation device 120 that may be used for selectively separating at least one reaction product of a chemical reaction in accordance with another embodiment of the present invention. The separation device 120 comprises a body 60' that includes a first portion 124 with an inlet end 52' and a second portion 126 with an outlet end 54'. The first portion 124 includes pores/passageways 134 having a size that is greater than the size of pores/passageways 136 of the portion 126. An inlet conduit 130 and a waste product conduit 132 are in fluid communication with the first portion 124 of the body 60'. An optional, substantially non-porous diamond coating 64' may cover all portions of a peripheral surface 58' of the body 60' except the portions of the body 60' that are in fluid communication with the inlet conduit 130 and the waste product conduit 132. As discussed above in the previously described embodiments, the size of the pores/passageways 134 and 136 may be controlled during the fabrication process by proper selection of the diamond particle size and HPHT sintering conditions used to form the first and second portions 124 and 126 of the body 60'.

During use in a separation apparatus, a fluid supply system (not shown in FIG. 8) may flow at least one reagent A through the inlet end 52' of the body 60' and at least one reagent B through the inlet port 130. For example, a pump (not shown) may pump the reagent A through a fluid line (not shown) and through the inlet end 52', and another pump (not shown) may pump the reagent B through another fluid line (not shown) and through the inlet port 130. The reagents A and B react with each other inside the pores/passageways 134 of the first portion 124 to form at least one reaction product P. The reaction product P flows out of the outlet end 54' of the body 60', while waste product W, including any un-reacted reagents A and B and any other reaction waste product, flow out of the body 60' through the waste-product port 132. The size of the pores/passageways 136 of the second portion 126 may be formed small enough so that substantially only the reaction P is capable of flowing through the second portion 126 and out of the outlet end 54', while the waste product W is large enough that it cannot flow through the second portion 126 and, thus, the waste product W flows out of the body 60' through the waste product conduit 132.

From the foregoing it will be appreciated that, although specific embodiments of the present invention have been described herein for purposes of illustration, various modifications may be made without deviating from the spirit and scope of the present invention. Accordingly, the present invention is not limited except as by the appended claims. The words "including" and "having," as used herein, including the claims, shall have the same meaning as the word "comprising."

What is claimed is:

1. A separation device, comprising:
a sintered body comprised of a plurality of diamond-to-diamond bonded grains extending from a proximal inlet end to a distal outlet end and through an intermediate region between the proximal inlet end and distal the outlet end, the body further including a plurality of at least partially interconnected pores disposed among the plurality of diamond-to-diamond bonded grains, wherein the at least partially interconnected pores provide at least one fluid passage that extends through the sintered body from the proximal inlet end to the distal outlet end, wherein the pores associated with the at least one fluid passage exhibit a larger pore size at a location adjacent the proximal inlet end than they do at a location adjacent the distal outlet end.

2. The separation device of claim 1, further comprising a substantially non-porous diamond coating formed on a peripheral surface of the intermediate region.

3. The separation device of claim 2, wherein the substantially non-porous diamond coating comprises diamond deposited by chemical vapor deposition or physical vapor deposition.

4. The separation device of claim 1 wherein the plurality of diamond-to-diamond bonded grains comprise surfaces that are chemically modified.

5. The separation device of claim 1 wherein the plurality of diamond-to-diamond bonded grains exhibit an average size between about 1 nm to about 1000 μm.

6. The separation device of claim 1 wherein the at least partially interconnected pores exhibit a density that varies within the body.

7. The separation device of claim 1 wherein the body comprises another inlet for introducing at least one chemical reagent and a waste-product port spaced from the another inlet and the proximal inlet end.

8. The separation device of claim 7, wherein the pores associated with the at least one passage exhibit a smaller size at locations between the waste-product port and the distal outlet end than they do between the proximal inlet end and the waste-product port.

9. The separation device of claim 1, further comprising a stationary phase disposed within at least some of the plurality of pores including within at least a portion of the at least one fluid passage.

10. A separation apparatus, comprising:
a separation device including a sintered body comprised of a plurality of diamond-to-diamond bonded grains extending from a proximal inlet end to a distal outlet end and through an intermediate region between the proximal inlet end and the proximal outlet end, the body further including a plurality of at least partially interconnected pores disposed between the plurality of diamond-to-diamond bonded grains, wherein the at least partially interconnected pores provide at least one fluid passage that extends through the sintered body from the proximal inlet end to the distal outlet end, wherein the pores associated with the at least one fluid passage exhibit a larger pore size at a location adjacent the proximal inlet end than they do at a location adjacent the distal outlet end; and
a fluid supply system in fluid communication with the at least one fluid passage body of the separation device, the fluid supply system operable to pass fluid through the body.

11. The separation apparatus of claim 10 wherein the fluid supply system comprises:
a mobile phase supply configured to hold a mobile phase;
a pump operable to pump the mobile phase into the separation device; and
a sample supply configured to hold a sample to be analyzed, the sample supply fluidly coupled to the separation device.

12. The separation apparatus of claim 10, further comprising:
a detector coupled to the separation device, the detector operable to identify at least one chemical constituent exiting through the outlet end of the body of the separation device.

13. The separation apparatus of claim 10, wherein the body comprises another inlet for introducing at least one chemical reagent and a waste-product port spaced from the another inlet and the proximal inlet end.

14. The separation apparatus of claim 13, wherein the pores associated with the at least one passage exhibit a smaller size at locations between the waste-product port and the distal outlet end than they do between the proximal inlet end and the waste-product port.

* * * * *